US010871241B2

(12) United States Patent
Loeber et al.

(10) Patent No.: US 10,871,241 B2
(45) Date of Patent: Dec. 22, 2020

(54) ASSEMBLY COMPRISING A VALVE UNIT, A SUCK-BACK UNIT AND A VALVE BODY

(71) Applicant: GEMUE GEBR. MUELLER APPARATEBAU GMBH & CO., KOMMANDITGESELLSCHAFT, Ingelfingen (DE)

(72) Inventors: Michael Loeber, Ingelfingen (DE); Harald Haidt, Oehringen (DE)

(73) Assignee: GEMÜE GEBR. MUELLER APPARATEBAU GMBH & CO., KOMMANDITGESELLSCHAFT, Ingelfingen (DE)

( * ) Notice: Subject to any disclaimer, the term of this patent is extended or adjusted under 35 U.S.C. 154(b) by 0 days.

(21) Appl. No.: 16/126,429

(22) Filed: Sep. 10, 2018

(65) Prior Publication Data

US 2019/0093788 A1 Mar. 28, 2019

(30) Foreign Application Priority Data

Sep. 22, 2017 (DE) .................. 10 2017 122 006

(51) Int. Cl.
| F16K 31/122 | (2006.01) |
| F16K 23/00 | (2006.01) |
| B05C 11/10 | (2006.01) |

(52) U.S. Cl.
CPC .......... *F16K 31/1225* (2013.01); *F16K 23/00* (2013.01); *B05C 11/1026* (2013.01)

(58) Field of Classification Search
CPC ... F16K 23/00; F16K 31/1225; B05C 11/1026
(Continued)

(56) References Cited

U.S. PATENT DOCUMENTS

| 5,918,810 A | 7/1999 | Fukano et al. |
| 5,927,605 A | 7/1999 | Odajima et al. |
| (Continued) | | |

FOREIGN PATENT DOCUMENTS

| DE | 19810473 A1 | 10/1998 |
| DE | 19811191 A1 | 10/1998 |
| (Continued) | | |

OTHER PUBLICATIONS

German Search Report, dated Jun. 27, 2018, pp. 1-9.

*Primary Examiner* — Darren W Gorman
(74) *Attorney, Agent, or Firm* — Bond Schoeneck & King, PLLC; George McGuire

(57) ABSTRACT

An assembly including a valve unit, a suck-back unit and a valve body is proposed, the valve body including a first channel portion which leads into a first chamber having a valve seat; the valve body including a second channel portion which connects the first chamber to a second chamber; the valve body including a third channel portion which leads away from the second chamber; the valve unit including a first actuator; the first actuator closing a connection between the first channel portion and the second channel portion when the first actuator is pressed against the valve seat; and the suck-back unit including a second actuator, the second actuator, when retracted inside the second chamber, sucking back a fluid in the third channel portion towards the second chamber if the connection between the first channel portion and the second channel portion is closed.

6 Claims, 3 Drawing Sheets

(58) Field of Classification Search
USPC .......................................................... 239/119
See application file for complete search history.

(56) References Cited

U.S. PATENT DOCUMENTS

| | | | |
|---|---|---|---|
| 5,931,384 A * | 8/1999 | Fukano | F16K 23/00 |
| | | | 222/571 |
| 5,938,119 A | 8/1999 | Yamada et al. | |
| 5,950,923 A | 9/1999 | Fukano et al. | |
| 5,950,924 A | 9/1999 | Hatakeyama et al. | |
| 5,967,414 A | 10/1999 | Fukano et al. | |
| 5,971,296 A * | 10/1999 | Fukano | B05B 1/28 |
| | | | 222/571 |
| 5,988,524 A * | 11/1999 | Odajima | G05D 7/005 |
| | | | 222/571 |
| 6,000,629 A | 12/1999 | Tamura et al. | |
| 6,176,438 B1 | 1/2001 | Sato et al. | |
| 7,445,163 B2 * | 11/2008 | Fukano | F16K 23/00 |
| | | | 222/571 |
| 7,637,440 B2 * | 12/2009 | Fukano | F16K 23/00 |
| | | | 239/104 |
| 2003/0178504 A1 | 9/2003 | Fukano et al. | |
| 2005/0006609 A1 | 1/2005 | Fukano | |
| 2010/0207048 A1 * | 8/2010 | Inoue | F16K 23/00 |
| | | | 251/331 |

FOREIGN PATENT DOCUMENTS

| | | |
|---|---|---|
| DE | 19811254 A1 | 10/1998 |
| DE | 19829793 A1 | 2/1999 |
| DE | 19938210 A1 | 3/2000 |
| DE | 69809099 T2 | 7/2003 |
| DE | 69809103 T2 | 7/2003 |
| DE | 10309112 A1 | 10/2003 |
| DE | 69814219 T2 | 4/2004 |
| DE | 102004032273 B4 | 9/2015 |

* cited by examiner

ASSEMBLY COMPRISING A VALVE UNIT, A SUCK-BACK UNIT AND A VALVE BODY

CROSS-REFERENCE TO RELATED APPLICATION

The present application relates and claims priority to German Application No. DE 10 2017 122 006.2, filed Sep. 22, 2017, the entirety of which is hereby incorproated by reference.

BACKGROUND

The invention relates to an assembly comprising a valve unit, a suck-back unit and a valve body.

Suck-back valves are generally known and are designed to suck a specified amount of a process fluid. Suck-back valves are used in the production of semiconductor wafers, for example, in order to prevent low amounts of process fluid, for example of a coating fluid, from exiting a supply connection if the flow of the process fluid is to be interrupted. Reference is made to DE 10 2004 032 273 B4 by way of example.

Proceeding therefrom, the object of the invention could be considered that of providing an assembly which simplifies the design complexity for implementing a suck-back function.

SUMMARY OF THE INVENTION

An assembly comprising a valve unit, a suck-back unit and a valve body is proposed. The valve body comprises a first channel portion, which leads into a first chamber comprising a valve seat. The valve body comprises a second channel portion, which connects the first chamber to a second chamber. The valve body comprises a third channel portion, which leads away from the second chamber. The valve unit comprises a first actuator, the first actuator forming a connection between the first channel portion and the second channel portion when said actuator is pressed against the valve seat of the first chamber. The suck-back unit comprises a second actuator, said actuator, when retracted inside the second chamber, sucking back a process fluid in the third channel portion in the direction of the second chamber if the connection between the first channel portion and the second channel portion is closed.

Advantageously, an assembly is proposed which constructively separates the functions of closing a fluid channel and back-sucking. Moreover, this constructive separation makes it possible to provide standardized identical or partially similar components in the form of the actuators and the drives for the valve unit and the suck-back unit. The benefit to the customer is that components can be used for different functions.

One advantageous embodiment is characterized in that the first and second actuators are identical. The same type of actuator can therefore be used for the valve function and the suck-back function, which is advantageous both for the manufacturer and for the customer. For example, it is not necessary to provide separate suck-back actuators and blocking elements.

One advantageous embodiment is characterized in that the first and second actuators each comprise a clamping portion, a membrane portion and a portion that protrudes with respect to the membrane portion. The protruding portion makes it possible to interact with a valve seat. The membrane portion also makes a large axial movement possible in order to provide a corresponding suck-back volume for the suck-back function.

One advantageous embodiment is characterized in that the valve body comprises a first connection region associated with the first chamber and a second connection region associated with the second chamber, and the first connection region and the second connection region being identical. Identical or similar drives can therefore be attached to the valve body.

One advantageous embodiment is characterized in that the first drive of the valve unit and the second drive of the suck-back unit each comprise an identical connection region.

One advantageous embodiment is characterized in that the second chamber does not comprise a valve seat for closing a connection between the second and third channel portions.

One advantageous embodiment is characterized in that the second actuator and the second chamber expose a first flow cross section in each operating position of the second actuator, which cross section is larger than or equal to a second flow cross section of the second channel portion, and which is larger than or equal to a third flow cross section of the third channel portion. This design of the flow cross section in the region of the second chamber has the advantage that one side of the fluid flow is influenced as little as possible and a suck-back volume is provided on the other side.

BRIEF DESCRIPTION OF THE DRAWINGS

Further advantages and features of the invention are also found in the following description of embodiments and in the drawings, in which.

DETAILED DESCRIPTION

Figure 1:
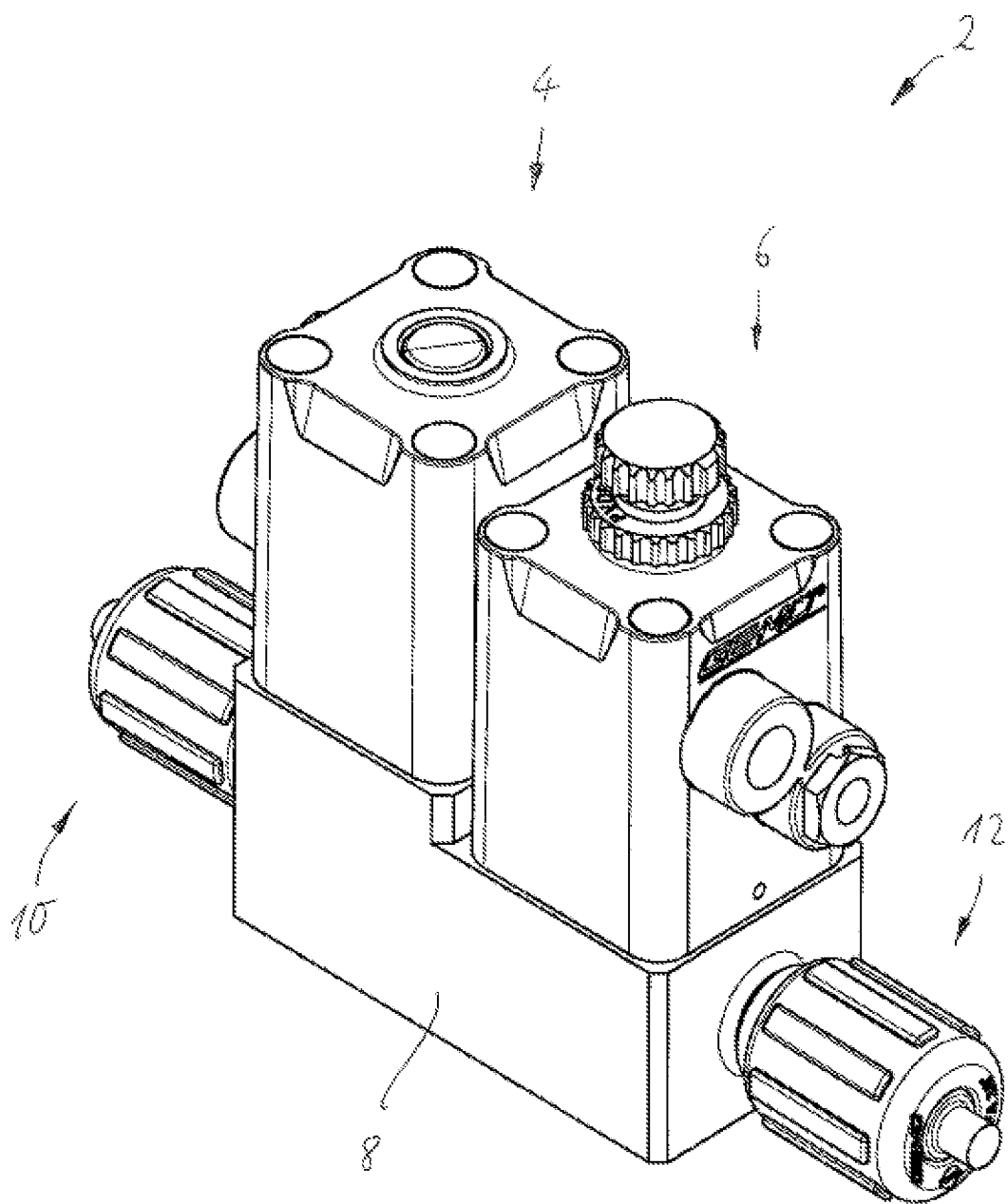
FIG. 1 is a schematic perspective view of an assembly.

FIG. 1 is a schematic perspective view of an assembly 2. The assembly 2 comprises a valve unit 4, a suck-back unit 6 and a valve body 8. The valve body 8 comprises an inlet 10 and an outlet 12.

Figure 2:
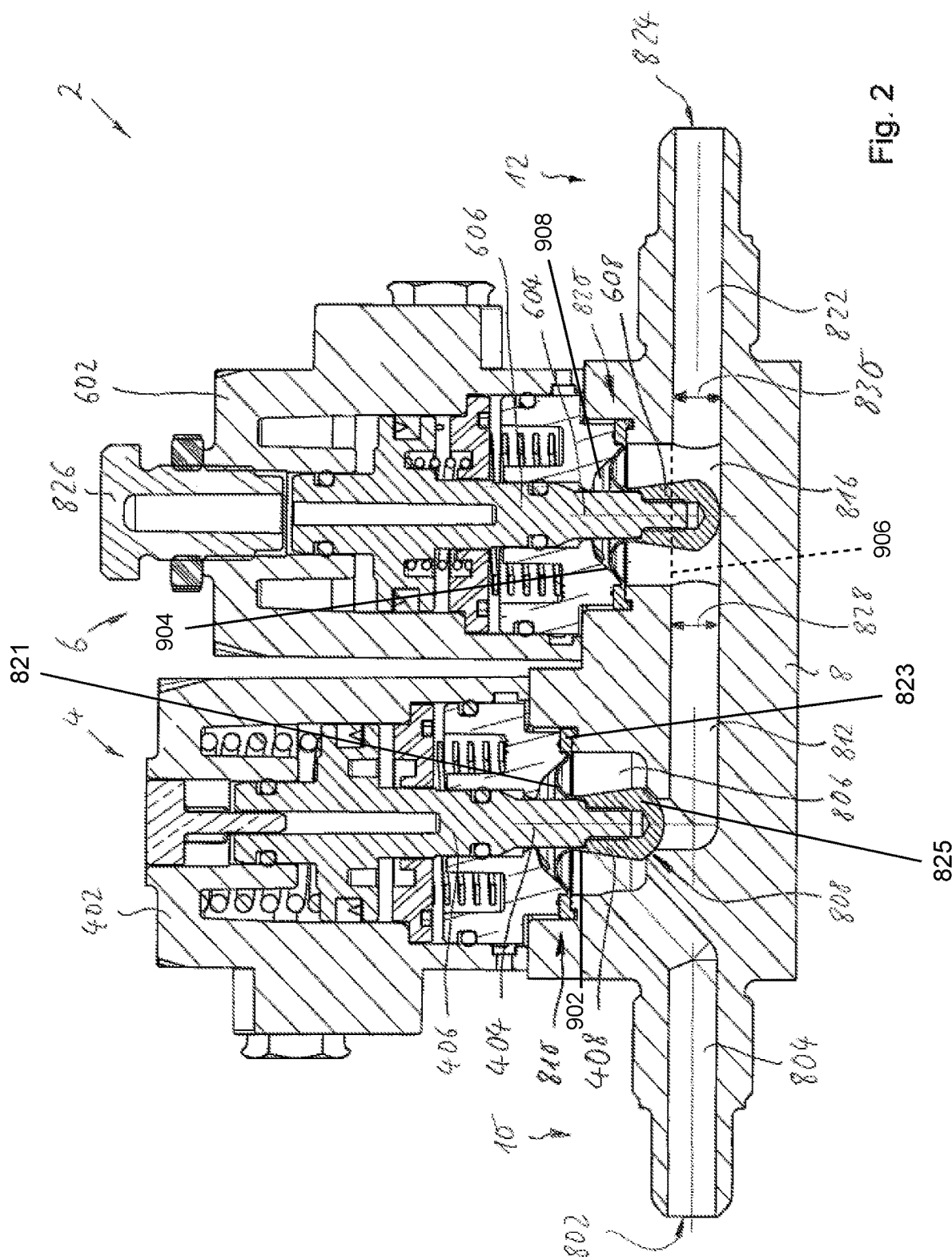
FIG. 2 is a schematic cross section of the assembly.

FIG. 2 is a schematic cross section of the assembly 2. The valve body 8 comprises a first channel portion 804, which starts from an inlet opening 802 of the inlet 10 and leads into a first chamber 806 comprising a valve seat 808. The first chamber 806 opens into a first connection region 810. A second channel portion 812 connects the first chamber 806 to a second chamber 816. The second chamber 816 opens into a second connection region 820. A third channel portion 822 connects the second chamber 816 to an outlet opening 824 of the outlet 12. Designing the two chambers 806 and 816 in the common valve body 8 means that the second channel portion 812 is advantageously shortened in contrast to a separate design having two valve bodies. The first connection region 810 and the second connection region 820 are identical, in order to provide a standard connection region for the drives 402 and 602. As a result, the valve unit 4 and the suck-back unit 6 comprise a connection region that corresponds in each case to the connection regions 810 and 820.

The valve unit 4 comprises a first drive 402 that is arranged on the first connection region 810 and comprises a first spindle 406 that can be moved along a first infeed axis 404. The drive 402 is a pneumatic drive in the present case.

A first actuator 408 is connected to the first spindle 406 and arranged in the first chamber 806. Due to the drive 402 being actuated, the spindle 406 is moved towards the valve seat 808. By pressing the actuator 408 against the valve seat 808, the connection between the first channel portion 804 and the second channel portion 812 is broken.

The suck-back unit 6 comprises a second drive 602 that is arranged on the second connection region 820 and comprises a second spindle 606 that can be moved along a second infeed axis 604. The drive 602 is a pneumatic drive in the present case. A second actuator 608 is connected to the second spindle 606 and arranged in the second chamber 816. The second chamber 816 does not comprise a valve seat and is therefore not designed to close a connection between the channel portions 812 and 822. The second chamber 816 is designed as a cylindrical bore in the present case, a longitudinal axis of the cylindrical bore extending perpendicularly to the longitudinal axes of the channel portions 812 and 822, and the cylindrical bore having a larger diameter than a diameter of the channel portions 812 and 822. The shape and volume of the second chamber 816 are matched to the actuator 608 such that in each operating position of the second actuator 608, a flow cross section is exposed that is at least equal to, although preferably larger than, a relevant flow cross section 828 of the second channel portion 812 or is larger than a flow cross section 830 of the third channel portion 822.

If the connection between the channel portions 804 and 806 is broken, the actuator 608 is retracted from the position shown in FIG. 2 along the infeed axis 604 and sucks in an amount of process fluid from the third channel portion 822 due to the resulting volume increase. The amount of process fluid sucked in can be adjusted by means of a stroke limiting means 826 that can be driven into the drive housing of the drive 602. The stroke limiting means 826 is manual in this case, although it may also be provided with a servomotor, of course.

The first and second actuators 408 and 608 can also be referred to as a plug diaphragm and comprise a radially outer clamping portion, which is clamped in the relevant connection region 810, 820 between the relevant drive 402, 602 and the valve body 8. A membrane portion 821 is radially inwardly connected to the radially outer clamping portion 823. A central protruding portion 825 is connected to the membrane portion 821. The central, protruding portion 825 comprises a fastening portion to a side that is not in contact with the medium, into which fastening portion the relevant spindle 406, 606 can be driven. On the opposite side of the fastening portion, the relevant actuator 408 and 608 comprises a region for contact with the medium and in particular for contacting a valve seat. The first and second actuators 408, 608 are identical.

The membrane portion 821 of the first and second actuator 408 and 608 comprises a junction portion 902. The junction portion 902 of the membrane portion 902 is arranged towards the central portion 825 of the first and second actuator 408 and 608. The junction portion 821 extends essentially parallel to the infeed axis 404, 604, respectively. A support surface 904 is provided on a dry side 908 of the second actuator 608. The support surface 904 is fixed with respect to the valve body 8. When the second actuator 608 is retracted inside the second chamber 816, then the membrane portion 821 of the second actuator 608 is in contact with the fixed support surface 904.

The second channel portion 812 follows an inner cylinder mantle surface. An imaginary extension 906 of the second channel portion 812 corresponds to an extension of the inner cylinder mantle surface of the second channel portion 812. The third channel portion 822 follows an inner cylinder mantle surface. The imaginary extension 906 of the second channel portion 812 corresponds to an extension of the inner cylinder mantle surface of the third channel portion 822. In the present example, the imaginary extension 906 of the second and third channel portions 812, 814 overlap inside the second chamber 816. When the second plug diaphragm according to the second actuator 608 is retracted inside the second chamber 816, then the central protruding portion 825 of the second plug diaphragm extends into the imaginary extension 906 of the second or third channel portion 812, 822.

Figure 3:
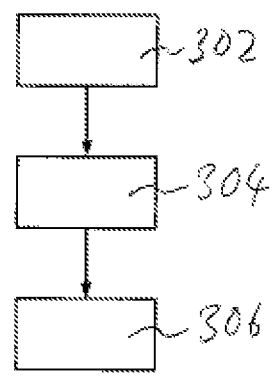
FIG. 3 is a schematic flow diagram.

FIG. 3 is a schematic flow diagram. In a first step 302, the first actuator is not pressed against the valve seat and the first and second channel portions are interconnected so as to convey fluid. Therefore, supplying a first amount of process fluid at the inlet of the assembly leads to a second amount of process fluid that corresponds with the first amount exiting at the outlet of the assembly. In a step 304, the first actuator is pressed against the valve seat and thereby closes the connection between the first and second channel portions. In a step 306, the second actuator is retracted towards the associated drive, in order to suck in the process fluid in the third channel portion.

What is claimed is:

1. An assembly comprising a valve unit, a suck-back unit and a valve body,
  wherein the valve body comprises a first channel portion that leads into a first chamber comprising a valve seat;
  wherein the valve body comprises a second channel portion that connects the first chamber to a second chamber;
  wherein the valve body comprises a third channel portion that leads away from the second chamber;
  wherein the second chamber is arranged between the second channel portion and the third channel portion;
  wherein the valve unit comprises a first plug diaphragm, wherein the first plug diaphragm closes a connection between the first channel portion and the second channel portion when said first plug diaphragm is moved along a first infeed axis and is pressed against the valve seat of the first chamber;
  wherein the suck-back unit comprises a second plug diaphragm, wherein when the second plug diaphragm is retracted along a second infeed axis inside the second chamber, said second plug diaphragm sucks back a fluid in the third channel portion towards the second chamber if the connection between the first channel portion and the second channel portion is closed;
  wherein the first and second plug diaphragms each comprise a clamping portion, a membrane portion and a central portion that protrudes with respect to the membrane portion, wherein a junction portion of said membrane portion arranged towards the central portion extends essentially parallel to the infeed axis;
  wherein, when said second plug diaphragm is retracted inside the second chamber, the membrane portion of the second plug diaphragm is in contact with a fixed support surface on a dry side of the second plug diaphragm;
  wherein, when said second plug diaphragm is retracted inside the second chamber, the central protruding portion of the second plug diaphragm extends into an imaginary extension of the second or third channel portion.

2. The assembly according to claim 1, wherein the first and second plug diaphragms are identically constructed.

3. The assembly according to claim 1, wherein the valve body comprises a first connection region associated with the first chamber and a second connection region associated with the second chamber, and wherein the first connection region and the second connection region are identical.

4. The assembly according to claim 3, further comprising a first drive of the valve unit and a second drive of the suck-back unit, wherein the first drive and the second drive comprise identically constructed connection regions in each case.

5. The assembly according to claim 1, wherein the second chamber does not comprise a valve seat for closing a connection between the second and third channel portions.

6. The assembly according to claim 1, wherein in each operating position of the second plug diaphragm, the second plug diaphragm and the second chamber expose a first flow cross section that is larger than or equal to a second flow cross section of the second channel portion, and that is larger than or equal to a third flow cross section of the third channel portion.

\* \* \* \* \*